US008386435B2

(12) United States Patent
Grondin et al.

(10) Patent No.: US 8,386,435 B2
(45) Date of Patent: Feb. 26, 2013

(54) SEARCHABLE ARCHIVE (75) Inventors: Richard Grondin, Ste-Julie (CA);
Evgueni Fadeitchev, Montrealt (CA);
Vassili Zarouba, Brossard (CA)

(73) Assignee: Informatica Corporation, Redwood City, CA (US)

( * ) Notice: Subject to any disclaimer, the term of this patent is extended or adjusted under 35 U.S.C. 154(b) by 170 days.

(21) Appl. No.: 11/746,583

(22) Filed: May 9, 2007

(65) Prior Publication Data
US 2007/0266044 A1 Nov. 15, 2007

Related U.S. Application Data (62) Division of application No. 10/783,643, filed on Feb. 20, 2004, now Pat. No. 7,243,110.

(51) Int. Cl.
*G06F 7/00* (2006.01)
*G06F 17/00* (2006.01)
(52) U.S. Cl. ........................ 707/661; 707/668
(58) Field of Classification Search ............. None
See application file for complete search history.

(56) References Cited

U.S. PATENT DOCUMENTS

| 5,574,906 | A | | 11/1996 | Morris |
| 5,835,667 | A | | 11/1998 | Wactlar et al. |
| 6,070,164 | A | * | 5/2000 | Vagnozzi ................ 707/100 |
| 6,976,053 | B1 | * | 12/2005 | Tripp et al. ............ 709/202 |
| 7,243,110 | B2 | * | 7/2007 | Grondin et al. ......... 707/102 |
| 7,353,236 | B2 | * | 4/2008 | Stickler ............ 707/103 Y |
| 2002/0065800 | A1 | * | 5/2002 | Morlitz ................ 707/1 |
| 2002/0123999 | A1 | * | 9/2002 | Bankert et al. ........... 707/10 |
| 2003/0001930 | A1 | | 1/2003 | Nakata et al. |
| 2003/0093434 | A1 | | 5/2003 | Stickler |
| 2004/0220980 | A1 | * | 11/2004 | Forster ................ 707/204 |
| 2004/0225688 | A1 | * | 11/2004 | Thaler et al. ............ 707/200 |
| 2005/0027756 | A1 | * | 2/2005 | Pettigrew ............... 707/204 |
| 2005/0033733 | A1 | * | 2/2005 | Shadmon et al. ............ 707/2 |
| 2005/0055372 | A1 | * | 3/2005 | Springer et al. ........ 707/104.1 |
| 2005/0138000 | A1 | * | 6/2005 | Roux et al. ............. 707/2 |

(Continued)

FOREIGN PATENT DOCUMENTS

| EP | 1152352 A2 | 11/2001 |
| WO | WO 01/59613 A2 | 8/2001 |

OTHER PUBLICATIONS

Hoss, *Top Ten Trends in Data Warehousing*, dataWarehouse.com, Oct. 30, 2001, 5 pgs.

(Continued)

*Primary Examiner* — Rehana Perveen
*Assistant Examiner* — Raheem Hoffler
(74) *Attorney, Agent, or Firm* — Marc S. Kaufman; Amardeep S. Grewal; Reed Smith LLP (57) ABSTRACT

A searchable archiving system. A searchable archiving system includes one or more compacted files of archive data loosely coupled to a search process. To create a compacted file, an archiving process tokenizes the archive data, optimizes the tokenized archive data, and extracts archive metadata from the tokenized data. The tokenized data may then be compressed in a variety of ways into compressed segments that may be individually accessed and decompressed by the search agents. Before compression, segment metadata is extracted from the segments. The compressed segments and segment metadata are then combined to create a compacted file. The search process accesses the compacted files by consulting locally stored archive metadata extracted from the files during the compaction process. The search process then invokes one or more search agents that actively search the compacted files. The search agents do so by using the segment metadata to identify segments to decompress and search.

30 Claims, 10 Drawing Sheets

U.S. PATENT DOCUMENTS

2005/0165838 A1* 7/2005 Fontoura et al. ............ 707/104.1
2006/0143180 A1* 6/2006 Peterson et al. .................. 707/9

OTHER PUBLICATIONS

Corworks, *Corworks Knowledge Server*, 4 pgs. Stamford.

Datz, *Emerging Technology, Innovation and Products in the Vanguard Company to Watch Corworks: Data Diets*, CIO Magazine, Jan. 1, 2003 issue, 2 pgs. Stamford.

Lindstrom, *Log Management: The Foundation of Network Security*; A Spire Research Report, Jan. 2003, 11 pgs., Spire Security, LLC, Malvern.

Poess et al., *Data Compression in Oracle*, 29th VLDB Conference, 2003, 11 pgs., Berlin.

Baeza-Yates et al., *Block Addressing Indices for Approximate Text Retrieval*, 1997, pp. 1-8 , CIKM, Las Vegas.

Navarro et al., *Adding Compression to Block Addressing Inverted Indexes*, Feb. 15, 2000, pp. 1-36, Kluwer Academic, Netherlands.

Vo et al., *Compressed Inverted Files with Reduced Decoding Overheads*, 1998 pp. 290-297, SIGIR, Melbourne.

Goldstein et al., *Compressing Relations and Indexes*, Jun. 18, 1997, pp. 1-23, University of Wisconsin, Madison.

Cannane et al, *A General-Purpose Compression Scheme for Large Collections*, Jul. 2002, pp. 329-355, vol. 20, No. 3, ACM Transactions on Information Systems.

Williams et al., *Compressing Integers for Fast File Access*, The Computer Journal, 1999, pp. 193-201, vol. 42, No. 3.

Buchsbaum et al., *Engineering the Compression of Massive Tables: An Experimental Approach*, pp. 175-184, AT&T Labs, Florham Park.

Babu et al., *A Model-Based Semantic Compression System for Massive Data Tables*, May 21-24, 2001, pp. 283-294, ACM Sigmod, Santa Barbara.

Garofalakis et al., *Data Mining Meets Network Management: The Nemesis Project*, pp. 1-6, Bell Laboratories, Murray Hill.

*The Daytona™*, Jan. 23, 2004, pp. 1-44, http://www.research.att.com/projects/daytona . . . .

Westmann et al., *The Implementation and Performance of Compressed Databases*, Germany, 13 pgs.

Scholer, *Compression of Inverted Indexes for Fast Query Evaluation*, Aug. 11-15, 2002, pp. 222-229, SGIR.

Ng, et al., *Relational Database Compression Using Augmented Vector Quantization*, 11th IEEE International Conference on Data Engineering, Mar. 6-10, 1995, pp. 1-10, Taipei.

Copeland et al., *A Decomposition Storage Model*, pp. 268-279, Microelectronics and Technology Computer Corporation, 1985 Austin.

European Search Report for EP App. No. 05250356.2, transmitted Oct. 6, 2006, dated Sep. 21, 2006, 2 pgs.

* cited by examiner

SEARCHABLE ARCHIVE

CROSS-REFERENCE TO RELATED APPLICATION(S)

This application is a divisional of application Ser. No. 10/783,643 filed Feb. 20, 2004, now U.S. Pat. No. 7,243,110 the contents of which are incorporated fully herein by reference.

BACKGROUND OF THE INVENTION

The present invention pertains generally to the field of archiving digital data and more specifically to compressed archives.

Many business enterprises generate large amounts of electronic data that are archived for a variety of purposes. Examples include archiving transaction data for auditing, customer service or data mining uses. A business enterprise may also be required to archive electronic data for regulatory purposes.

The life cycle of most enterprise data begins with generation of the data during some sort of customer interaction or transaction. The enterprise data is typically created and initially stored within a database system. The advantage of a database system is that the data is organized into data structures that may be rapidly queried. However, most database systems impose some limitations on the amount of data that is stored. Some database systems simply have a finite limit on the amount of data that may be accessed. Other database systems may be able to accommodate large amounts of data but may be expensive to maintain when the database system exceeds a certain size. Therefore, database systems are not typically used to archive large amounts of data for long periods of time.

One method used to archive large amounts of data is to store the data on serially accessed file systems such as a tape system or on a randomly accessed file system such as a large or distributed disc drive system. Tape system storage is inexpensive; however, it is cumbersome in that the data must be reloaded into a database system before the data can be queried. Disc storage systems are more expensive than tape systems but offer greater accessibility. However, if the data is stored as conventional files, the data must still be loaded into a database system before the data can be accessed or queried.

As large database systems are an expensive solution to archiving data and conventional file storage systems do not lend themselves to convenient access, it would be desirable to have an archive system that is both easy to query and inexpensive to maintain.

SUMMARY OF THE INVENTION

A searchable archiving system is provided. A searchable archiving system includes one or more compacted files of archive data. To create a compacted file, an archiving process tokenizes the archive data, optimizes the tokenized archive data, and extracts metadata from the tokenized data. The tokenized data may then be compressed in a variety of ways into compressed segments. The compressed segments and segment metadata are then combined to create a compacted file. Compacted files are then stored on one or more file systems that are loosely coupled to a search process. To retrieve data from the archive, a search process accesses the compacted files by consulting locally stored metadata extracted from the files during the compaction process to identify which compacted files may hold the data if interest. The search process then invokes one or more search agents that actively search the compacted files. The search agents do so by selecting compressed segments using the decompressing segments from within the compacted file.

In one aspect of the invention, an archiving process creates a searchable archive by generating a domain structure and tokenized data from archive data. The archiving process then determines archive metadata from the tokenized data and stores the archive metadata in a local data store such as a database. The archiving process then divides the tokenized data into one or more segments and determines segment metadata from the one or more segments. These segments are compressed and one or more compacted files are created from the one or more compressed segments and the segment metadata. The compacted files may then be filed in any convenient file system.

To retrieve data from the archive, a search process selects a compacted file from the one or more compacted files that may include a datum to be retrieved using the local stored archive metadata. The search process then accesses the selected compacted file and selects a selected compressed segment from the one or more compressed segments in the selected compacted file using the segment metadata. The search process then decompresses the selected segment and searches the decompressed segment to determine if the decompressed segment includes the datum.

In another aspect of the invention, the search process is performed by different software entities. The initial compacted file selection is performed by a search process. Once one or more compacted files have been selected, the search process invokes one or more search agents to access the selected compacted files, select compressed segments, decompress the selected segments, and search the decompressed segments.

In another aspect of the invention, the tokenized data set includes one or more columns of tokens and determining archive metadata by the archiving process further includes determining a maximum token value and a minimum token value for each of the one or more columns of tokens.

In another aspect of the invention, determining the segment metadata by the archiving process further includes finding a maximum token value and a minimum token value included in the segment.

In another aspect of the invention, the compacted files are stored as a set of bit vectors. The use of bit vectors in the compacted files allows more sophisticated data operations to be performed within the searchable archive. To generate such a compacted file, the archiving process generates a domain structure and tokenized data from archive data and determines archive metadata from the tokenized data. The archiving process then generates a set of bit vectors from the tokenized data and creates one or more compacted files from the set of bit vectors.

To access the compacted files including bit vectors, a search process selects a selected compacted file from the one or more compacted files that may include a datum using the archive metadata. The search process then accesses the selected compacted file and performs a Boolean operation on selected bit vectors to determine if the datum is stored in the compacted file. This retrieval process may be partitioned between a parent search process and one or more search agents as previously described.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
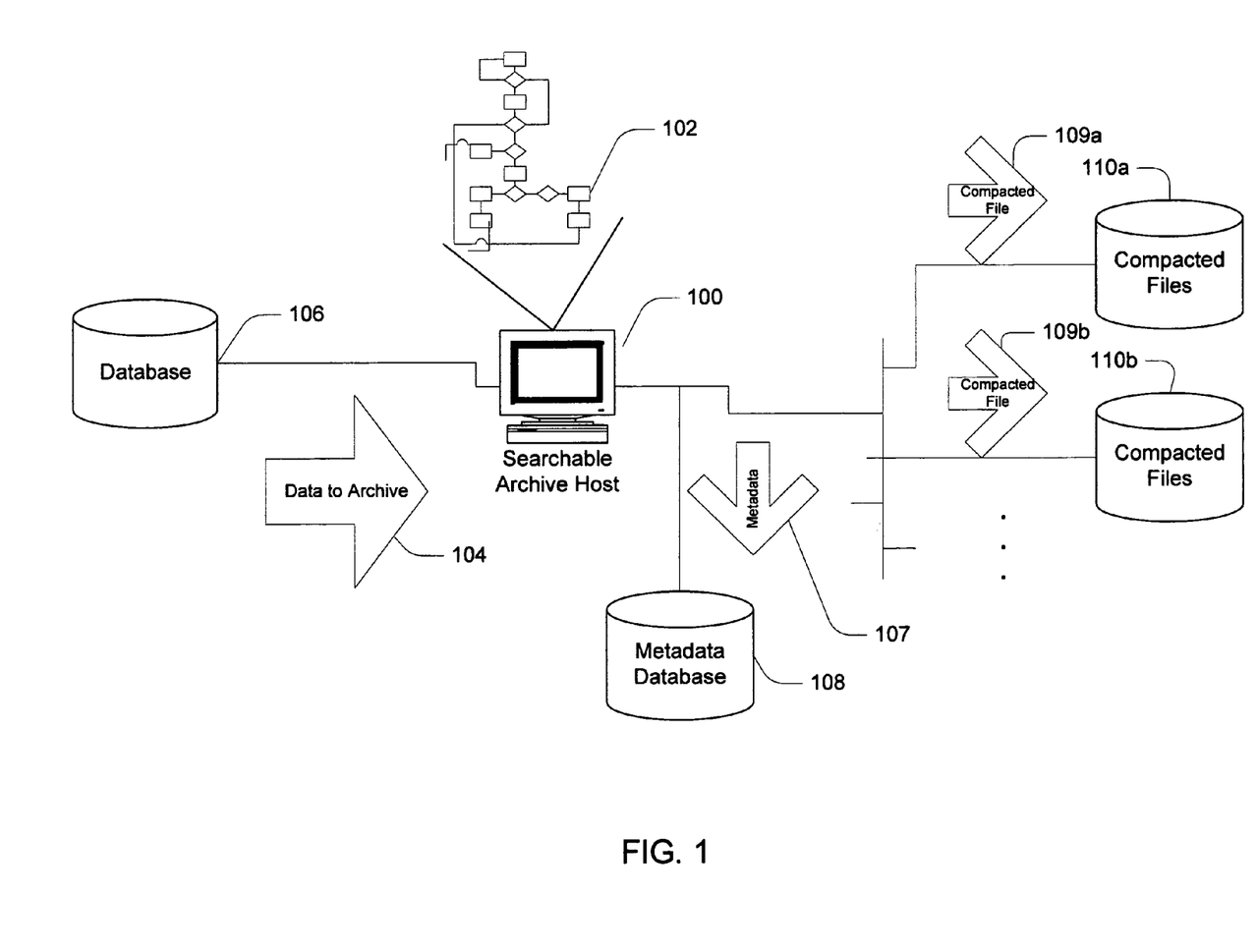
FIG. 1 is a block diagram of a searchable archive system in an archiving mode in accordance with an exemplary embodiment of the present invention.

FIG. 1 is a block diagram of a searchable archive system in an archiving mode in accordance with an exemplary embodiment of the present invention. A searchable archive system includes a searchable archive host 100. The searchable archive host hosts an archiving process 102. The archiving process receives or gets archive data 104 from a database 106, such as a tabular file in a format such as a Comma Separated Value (CSV) formatted text file, coupled to the searchable archive host. The archiving process extracts metadata 107 describing the archive data from the archive data and stores the metadata in a metadata database 108. The archiving process also generates one or more compacted files, such as compacted files 109*a* and 109*b*, that are stored in one or more compacted file data storage devices, such as compacted file storage devices 110*a* and 110*b*.

As illustrated in FIG. 1, the storage devices are coupled directly to the searchable archive host. In other embodiments, the storage devices are loosely coupled to the storage devices through a communications network. This enables the searchable archive to be distributed across as many storage devices as necessary to storage the compacted files. In addition, the loose coupling between the metadata and the compacted files allows the searchable archive to be added to in an incremental manner without requiring reconstituting the original archive data using the compacted files.

Figure 2A:
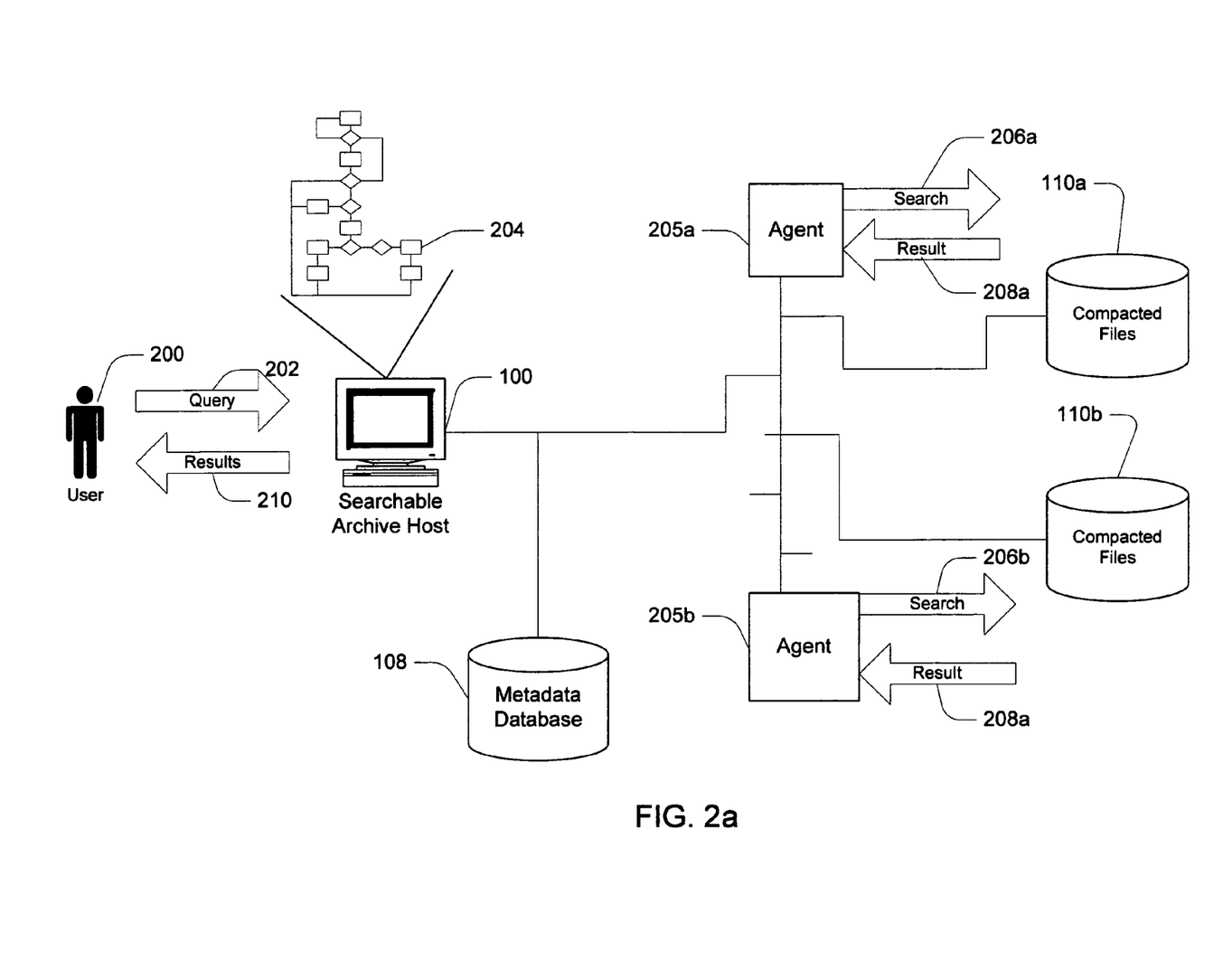
FIG. 2*a* is a block diagram of a searchable archive system in a data retrieval mode in accordance with an exemplary embodiment of the present invention.

FIG. 2*a* is a block diagram of a searchable archive system in a data retrieval mode in accordance with an exemplary embodiment of the present invention. Once an archive is created, a user 200 or an automated process may access the compacted files without reconstituting the entire original archive data structure. To do so, the user uses a search process 204 hosted by the searchable archive host. The user submits a query 202 to the search process. The search process uses a metadata database 108 to identify which compacted files may have archived data that will satisfy the query. The search process then accesses each identified stored compacted file to determine if there are any actually data stored in the compacted file that will satisfy the original query. The search process does so through the use of one or more search agents, such as search agents 205*a* and 205*b*, that independently access one or more compacted files stored in the compacted file storage devices, such as storage devices 110*a* and 110*b*.

Each search agent conducts an independent search, such as search 206*a* by search agent 205*a* and search 206*b* by search agent 205*b*, of one or more compacted files identified by the search process. Each search agent also independently reports search results, such as search results 208*a* and 208*b*, back to the search process. The search process uses the search results received from the search agents to build a search result 210 that is presented to the user.

Figure 2B:
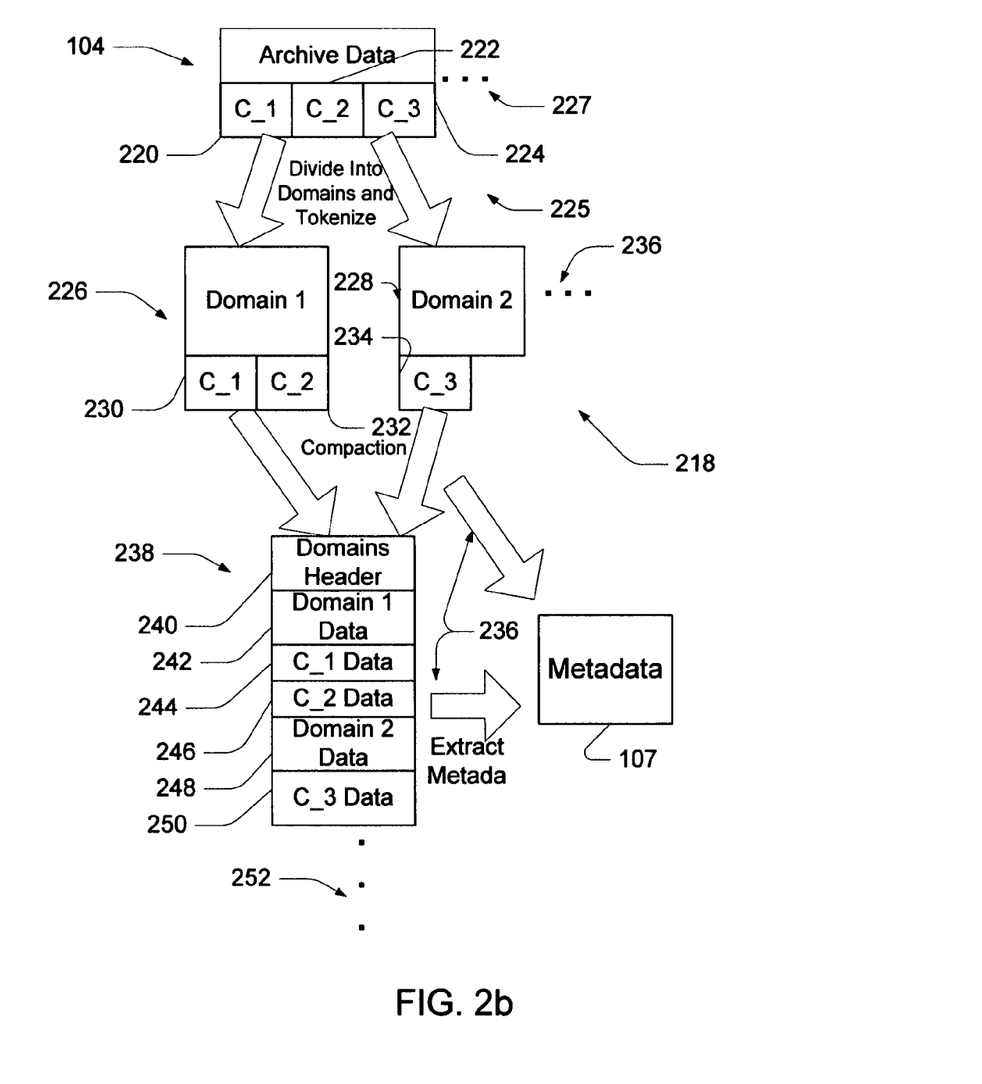
FIG. 2*b* is a flow diagram of a searchable archive generation process in accordance with an exemplary embodiment of the present invention.

FIG. 2*b* is a flow diagram of a searchable archive creation process in accordance with an exemplary embodiment of the present invention. A searchable archive creation process 218 receives archive data 104 including one or more columns of values, such as columns 220, 222, and 224. The number of columns in the archive data, and the number of values in the columns, is arbitrary as indicated by ellipses 227. The process associates (225) the columns of data in one or more domains, such as domains 226 and 228. Each domain may then be associated with one or more columns of data from the archive data.

After associating the columns to domains, each domain is processed separately to generate columns of tokens corresponding to the value columns in a tokenization process. For example, token column 230 is associated with domain 226 and corresponds to value column 220 in the archive data. In a similar manner, token column 232 is associated with domain 226 and corresponds to value column 222. In the exemplary process, two domains are shown. Domain 228 is associated with only a single token column 234 corresponding to value column 224 in the archive data. Ellipses 236 indicate that the number of domains and associated token columns is arbitrary as the number of columns in the archive is arbitrary.

Once the domains and token columns have been created, they are compressed in a compaction process (236) to create a compacted file 238. Within the compacted file, information about the domains included in the compacted file is stored in a domains header 240. In addition, domain data for each domain is stored in the compacted file. For example, domain data 240 corresponds to domain 226 created during the tokenization process and domain data 248 corresponds to domain 228. The domain data includes a domain structure associating unique values from the archive data to token values used to generate the token columns. The compacted file further includes compressed token column data, such as compressed token column data 244, 246, and 250 for each token column associated to a domain. For example: compressed token column data 244 corresponds to token column 230; compressed token column data 246 corresponds to token column 232; and compressed token column data 250 corresponds to token column 234. Ellipses 252 indicated that the size of the compacted file is arbitrary as it is dependent on the size of the original archive data set.

During the tokenization and compaction process, archive metadata and segment metadata 107 is extracted (236) for use as an index for accessing the compacted file. The metadata may exported in a variety of formats that may be useful an archive retrieval process.

Figure 3:
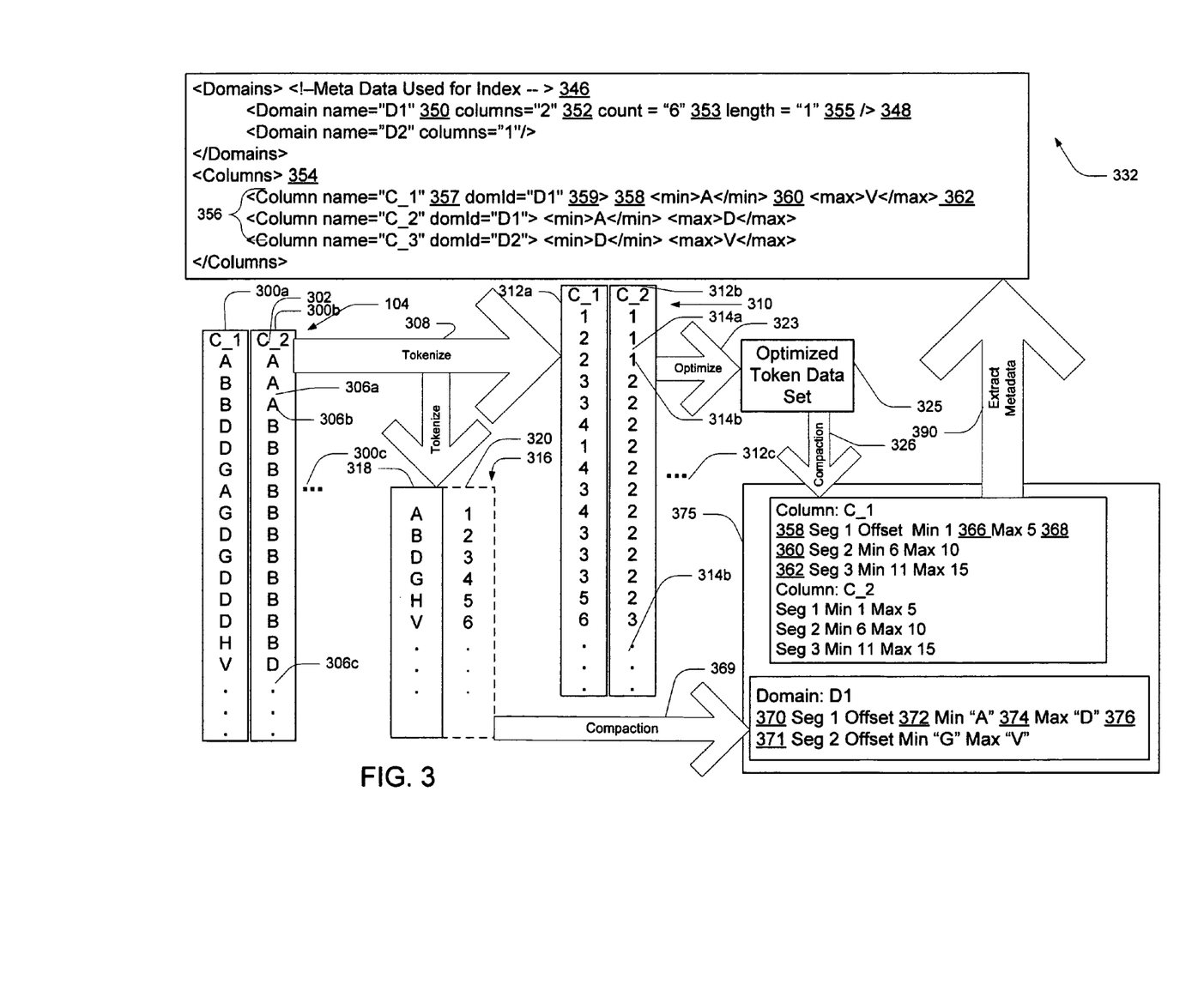
FIG. 3 is a block diagram of a searchable archive creation process in accordance with an exemplary embodiment of the present invention.

FIG. 3 is a block diagram of an compacted file creation process in accordance with an exemplary embodiment of the present invention. In a compacted file creation process, a portion of an archive data set 104 associated with a domain includes one or more value columns, such as value columns 300*a* and 300*b*, of tabulated values. Ellipses 300*c* indicate that the number of value columns in the archive data set is arbitrary. Each value column may be characterized by a value column header 302 and one or more rows of tabulated values, such as rows 306*a* and 306*b*. Ellipses 306*c* indicate that the number of rows of value in the value columns are arbitrary.

During the archive creation process, the archive data set is tokenized (308). During tokenization, the values in a value column are replaced with tokens to create a token column. If the length of the token is less than the length of the unique value, then the overall size of the column of data will be reduced, thus compressing the archive data set. For example, in the block diagram, a tokenized data set 310 is generated from the archive data set 104 during tokenization. The tokenized data set retains the column formation of the archive data set. In the example, token column 312*a* corresponds to archive value column 300*a* and token column 312*b* corresponds to archive value column 300*b*. Ellipses 312*c* indicate that the number of token columns correspond to the number of value columns in the original archive data. In each token column, a token exists for each value in the original corresponding archive data value column. For example, token 314*a* corresponds to value 306*a* and token 314*b* corresponds to value 306*b*. Ellipses 314*c* indicate that the number of tokens in a token column correspond to the number of values in the archive data's corresponding column.

In addition to a tokenized data set, tokenization creates a domain structure 316 associating the token values and the unique values. The domain structure includes the sorted unique values 318 extracted from the archive data. Their position inside the list is their associated token value. In addition, as the unique values are stored in sorted form, their position in the table also indicates a lexical id for their corresponding token values. This feature of a domain structure is illustrated by lexical id column 320 shown in phantom.

Once the tokenized data set has been created, opportunities exist to optimize (322) the size of the tokenized data set. For example, before the domain structure is complete, it is difficult to determine the optimal size of the tokens because the number of tokens needed to represent the unique values in the archive data is unknown. However, after the domain structure is complete, the total number of tokens, and therefore the optimal size for the tokens, can be easily calculated. Once the optimal token size is determined, the tokens in the tokenized data set may be replaced with a new set of optimally sized tokens thus creating an optimized token data set 325.

The optimized domain structure is compacted (369) by dividing the domain structure into one or more compressed domain structure segments, such as compressed domain structure segments 370 and 371, in compacted file 375. The number and size of the domain structure segments depends on the number of unique values in the domain structure. During compaction, the domain structure is examined to determine how to divide the domain structure into individual compressed domain structure segments. The determination is based on the desired size of the compressed domain structure segments and the number of unique values in the domain structure. For example, if a domain structure has very few unique token values, it may compress to a small size and may fit within one compressed domain structure segment. In contrast, if a domain structure contains many unique values, more than one compressed domain structure segment is used to hold the compacted domain structure.

For each domain structure segment, the minimum and maximum values are kept for the domain structure segment. As no value exists in more than one domain structure segment, the minimum and maximum values constitute a coarse index that is used to determine which domain structure segments should be used when searching for a particular unique value. The segments are then individually compressed using a prediction by partial matching (PPM) algorithm. This type of algorithm uses the last few characters of a value to predict the next character and is well suited for compression of the domain structure because the unique values are already sorted.

In the illustrated compacted file 368, the compacted file includes domain D1 having a domain structure divided into two compressed domain structure segments 370 and 371. An offset 372 indicates the position in the compacted file of a compressed domain structure segment. In addition, a minimum value 374 and a maximum value 376 indicate the range of unique values included in the compressed domain structure segment.

After tokenization and optimization, the optimized tokenized data set is compacted (326) and stored in the compacted file as well. For each token column in the tokenized data set one or more compressed token column segments are created. The number and size of the compressed token column segments depends of the numbers of tuples (records) of the archive data set. For each compressed token column segment, starting and ending tupleid are recorded. As there is a low degree of correlation between the tokens stored in the token columns, a statistic algorithm based on arithmetic coding is used for the creation of the compressed token column segments.

As an example, in the illustrated compacted file 368, the compacted file includes compressed token column segments 358, 360, and 362 corresponding to token column 312*a* which corresponds to value column 300*a*. For each compressed token column segment, a minimum tupleid 366 and a maximum tupleid 368 are indicated. Compressed token column segments are located in the compacted for each token column associated with the domain.

Once completed the, the compacted file includes compressed domain structure and token column data. During the tokenization and compaction process, domain metadata, token column metadata, and segment metadata is extracted (390) from the domain structure and the token columns. Portions of the extracted metadata is included in the compacted file as a header accessible without decompressing any of the segments in the compacted file. Portions of the archive metadata are also included in a metadata file 332. The metadata file may be used by a data processing system to access data stored in the compacted files.

An exemplary metadata file is illustrated in an eXtensible Markup Language (XML) format; however, any format may suffice. In the exemplary metadata file, metadata is included to show metadata extracted from a first and second domain; however, the number of domains is arbitrary. Within an XML format metadata file, a "Domains" tag 346 includes one or more domain tags 348. Each domain tag includes a "Domain name" attribute 350 and a "columns" attribute 352. The columns attribute indicates the number of token columns in a domain. A "count" attribute 353 indicates the number of total unique values stored in the domain structure. A "length"

attribute 355 indicates the length of the unique value storage locations within the domain structure.

A "Columns" tag 354 includes one or more column tags 356. Each column tag includes a "Column name" attribute 357 indicating the name of a value column from the archive data included in the compacted file. The column tag further includes a "domid" attribute 358 indicating the domain to which the column belongs. A "min" attribute 360 indicates the minimum unique value found in the column. A "max" attribute 361 indicates the maximum unique value found in the column.

Referring again to FIG. 1 once the compaction process is completed, a compacted file 328 (of FIG. 3) is stored in a file system having one or more compacted file data stores, such as compacted file data store 110a and 110b. Metadata file 332 (of FIG. 3) is used to populate a metadata database 108. As the compacted files are stored in a file system, new archive data may be added to the archive system to the capacity of the file system. In addition, metadata may be added to the metadata database to the extent of the capacity of the metadata database.

Figure 4:
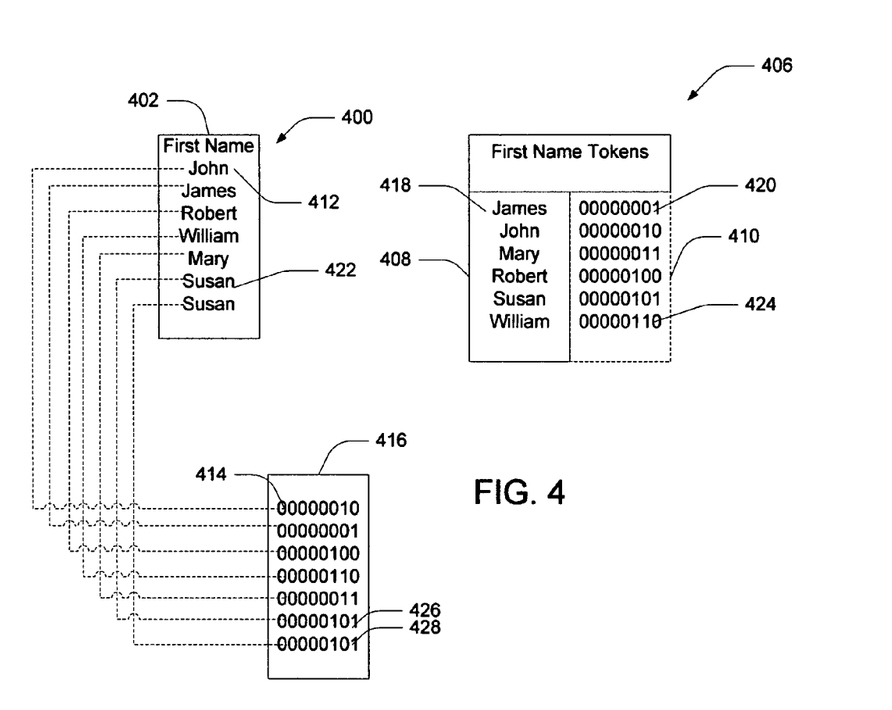
FIG. 4 is a block diagram of a tokenization process in accordance with an exemplary embodiment of the present invention.

FIG. 4 is a block diagram of a tokenization process in accordance with an exemplary embodiment of the present invention. In the illustrated tokenization process, an archive data set 400 includes a "First Name" column 402. In this illustration, each unique First Name column entry is replaced by an eight bit token. For the First Name column, a "First Name Tokens" domain structure 406 is created. The domain structure has a name column 408 for storage of unique first names encountered in the archive data set. The domain structure includes a token column 410 for storage of tokens assigned to the unique values.

In this example, the name "John" 412 is the first unique value in the column and is replaced by the token "00000010" 414 in the tokenized data set 416. An entry is made into the domain structure for the unique value "John" 418 and the assigned token value "00000010" 420. For each subsequent unique value in the column, a new token value is generated, associated with the unique value in the domain structure, and used to replace the unique value in the tokenized data set.

In the case where the unique value is encountered in the archive data again, a new token value is not generated. Instead, the token value is read from the domain structure and inserted into the tokenized data set. In the illustrated example, the unique value "Susan" 422 appears in the archive data more than once. The value Susan is associated in the domain structure with the token "00000101" 424. This token is then inserted into the tokenized data set two times, at location 426 and 428, to represent the two instances of Susan in the original archive data.

Figure 5:
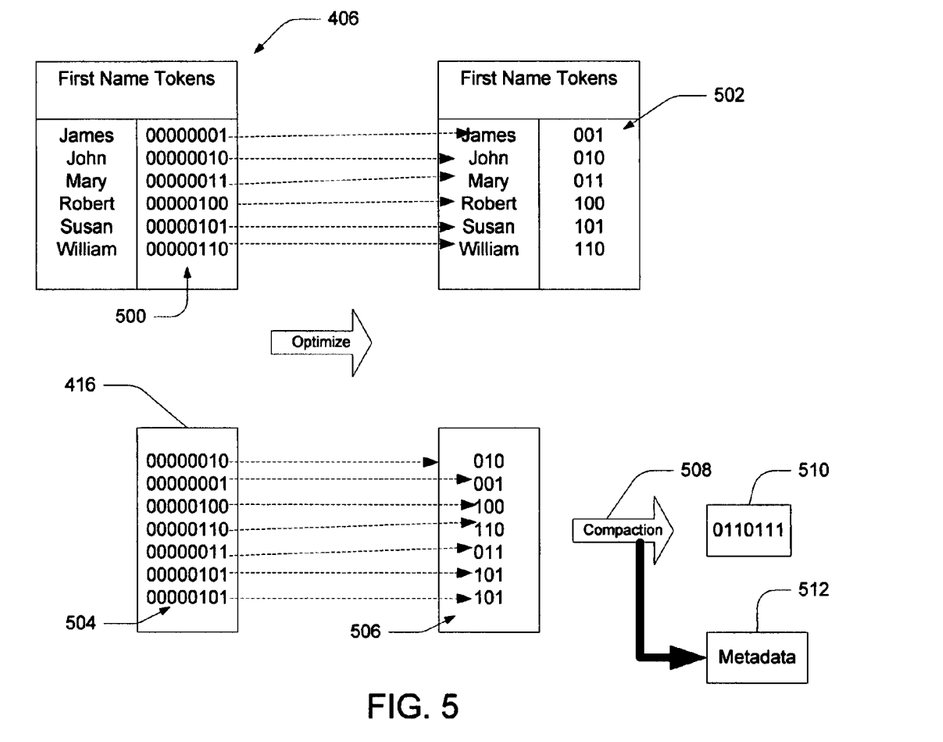
FIG. 5 is a block diagram of a token optimization process and tokenized data set compaction process in accordance with an exemplary embodiment of the present invention.

FIG. 5 is a block diagram of a token optimization process and tokenized data set compaction process in accordance with an exemplary embodiment of the present invention. Once a tokenized data set is created from the archive data, the number of tokens needed to represent all of the unique values in the archive data is known. Therefore, an optimal size can be determined for the size of the tokens used. In the example of FIG. 4, an eight bit token is used. An eight bit token can represent up to 256 unique values. However, at the end of the tokenization process, it can be seen that the number of unique values in the example was only six. Therefore, a three bit token is all that is required to give each unique value a unique token value. Referring again to FIG. 5, domain structure 406 is optimized by replacing eight bit tokens 500 in the token column with three bit tokens. This generates an optimized domain structure having three bit tokens 502. In a similar manner, tokenized data set 416 from the example in FIG. 4 is optimized by replacing eight bit tokens 504 with three bit tokens 506.

Once the tokenized data set has been optimized, it may be compacted (508) to generate a compacted file 510. During the compaction process, previously described metadata 512 is extracted from the tokenized data set.

Figure 6:
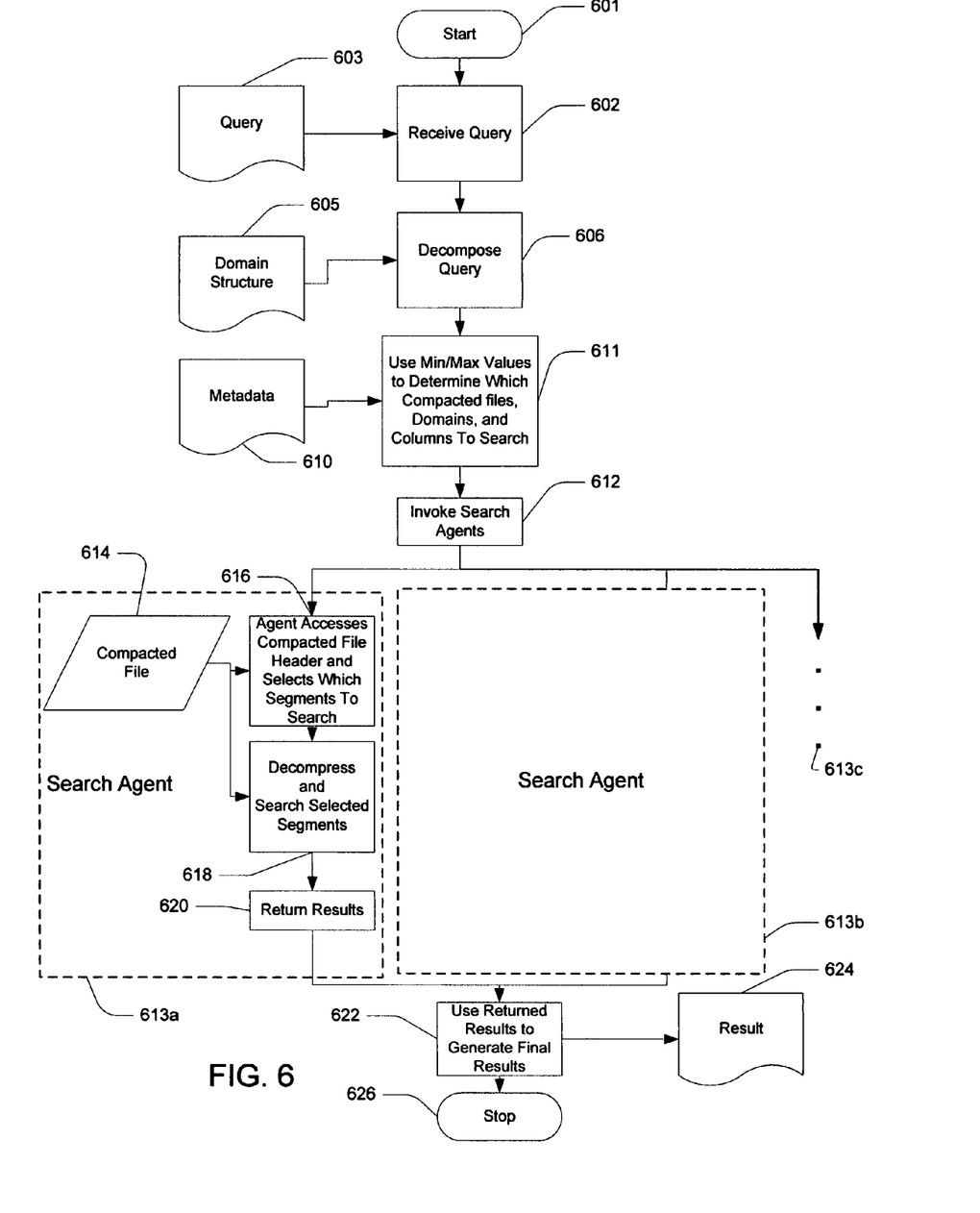
FIG. 6 is a process flow diagram of a search process employing search agents in accordance with an exemplary embodiment of the present invention.

FIG. 6 is a process flow diagram of a search process employing search agents in accordance with an exemplary embodiment of the present invention. As previously described, search agents, such as search agents 205a and 205b (of FIG. 2), are used within the archive system to access the compacted files and retrieve archive data. The search agents are invoked by a search process 204 (of FIG. 2). At the start (601) of a search process, the search process receives (602) a query 603 from a user or an automated process. The search process uses a domain structure 605 to decompose (606) the query into an equivalent tokenized query.

The search process accesses metadata 107 to determine (611) which compacted files, domains, and columns need to be searched to find archived data that may satisfy the query. The search process does so by using the minimum and maximum token values extracted from the columns in a compacted file before the columns were segmented and compressed. These minimum and maximum values are compared to the token values in the tokenized query to make the determination. Once the determination is complete and compacted files have been selected, the search process invokes (612) one or more search agents, such as search agents 613a and 613b, that will independently access the identified compacted files. Ellipses 613c indicate that an arbitrary number of independently functioning search agents may be invoked by the search process. This allows the search process to search a plurality of compacted files independently. In addition, as search agents are used to access the compacted files, the compacted files may be maintained in any convenient manner and loosely coupled to the search process.

The following search agent process is described for a single search agent; however, each invoked search agent will perform similar search processes in parallel. Once invoked, each search agent accesses (616) a compacted file 614 and searches the compacted for archived data that may satisfy the query. To do so, the search agent reads the compacted file's header to determine which domain structure segments may contain data that may satisfy the query. As the compacted file's header includes the minimum and maximum token values stored in each compressed domain structure segment, the search agent may determine which segments may include data that will satisfy the query. Once a compressed segment has been identified as possibly containing the desired data, the search agent decompresses (618) the selected compressed segment and searches the decompressed segment for the requested data and identifies the token associated with the values involved into the request criteria. The process is repeated for each compressed segment identified by the search agent as potentially containing the desired archive data. After that process, token representation of the request criteria is used to analyze each tokenized dataset segment involved. The search agent returns (620) any result data found during the search to the search process. The search process collects all of the returned results to generate a final search result 624 and stops (626) searching.

Figure 7:
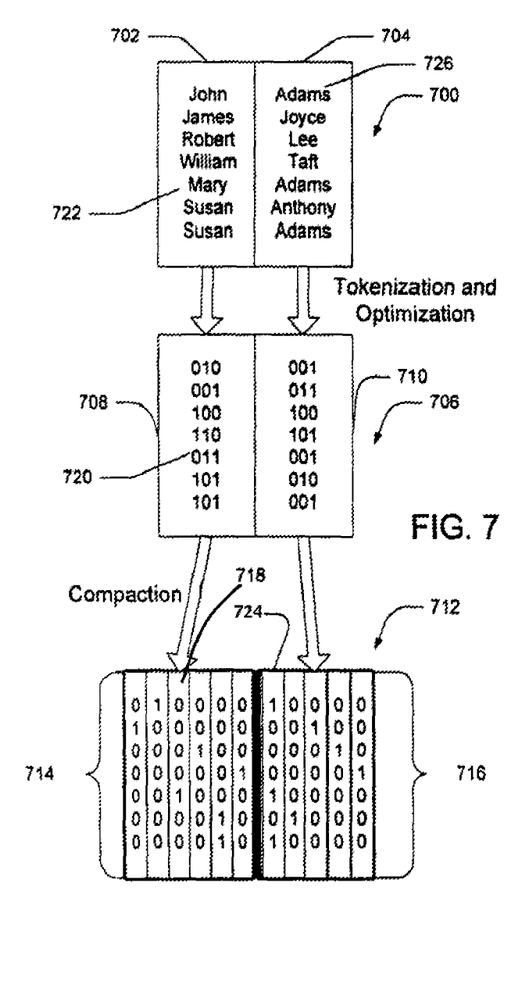
FIG. 7 is a block diagram illustrating a compaction method in accordance with an exemplary embodiment of the present invention.

FIG. 7 is a block diagram illustrating a bit vector based compaction method in accordance with an exemplary embodiment of the present invention. In this compaction method, the compacted file may be searched in its entirety without decompressing any of the data stored in the compacted file. Archive data 700 having multiple columns of data is tokenized and optimized as previously described. In this example, the archive data is a listing of first and last names of a group of individuals with the first names in a first archive value column 702 and the last names in a last name archive value column 704. The result of the tokenization and optimization process is a tokenized and optimized data set 706. The tokenized data set includes a first name token column 708 corresponding to the first name archive value column and a last name token column 710 corresponding to the last name archive value column. The tokenized data set may be compressed through the generation of a set of bit vectors 712.

Each bit vector in the set of bit vectors corresponds to a token. The length of each bit vector is equal to the number of token values in a token column. The values in the bit vector reflect the presence or absence of the corresponding token at a particular position in the token column. For example, bit vector 718 corresponds to the token "011" 720 in the first name token column. Token "011" appears at the fifth position in the first name token column; therefore, a "1" appears in the fifth position in bit vector 718. As token "011" corresponds to the name "Mary" 722 in the first name column of the archive data, this means that the name "Mary" is the fifth entry in the first name value column of the archive data set. In a similar manner, bit vector 724 corresponds to the last name "Adams" 726 in the last name value column of the archive data set. Upon completion of the vectorization process, the compacted file consists of subsets of bit vectors with each subset corresponding to a token column in the tokenized data set and thus a column in the archive data set. In this example, bit vector subset 714 corresponds to the first name value column in the archive data and bit vector subset 716 corresponds to the last name value column in the archive data.

One feature of the tokenization process is that it creates a lexical ordering of the values in a column of an archive data set. As such, the bit vectors need not be stored with header information identifying which bit vector is associated with which token. Instead, the bit vectors are stored in a compact fashion in the lexical order of the tokens.

Figure 8:
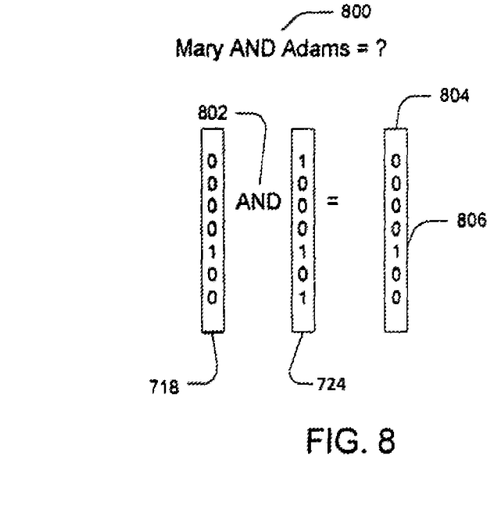
FIG. 8 is block diagram illustrating the use of Boolean operations on bit vectors to generate query results in accordance with an exemplary embodiment of the present invention.

FIG. 8 is block diagram illustrating the use of Boolean operations on bit vectors to generate query results in accordance with an exemplary embodiment of the present invention. The bit vectors of FIG. 7 may be used directly in Boolean operations to satisfy queries. As an example, a query for the name "Mary Adams" may be decomposed into a query expression of "First Name=Mary" AND "Last Name=Adams" 800. This expression may be evaluated for the entire compacted file 712 (of FIG. 7) by selecting bit vector 718 corresponding to the first name "Mary" and bit vector 724 corresponding to the last name "Adams". These bit vectors may be combined in a Boolean AND operation 802 to yield a result bit vector 804. This bit vector has a "1" 806 in the fifth position indicating that the name "Mary Adams" is found in the compacted file.

Figure 9:
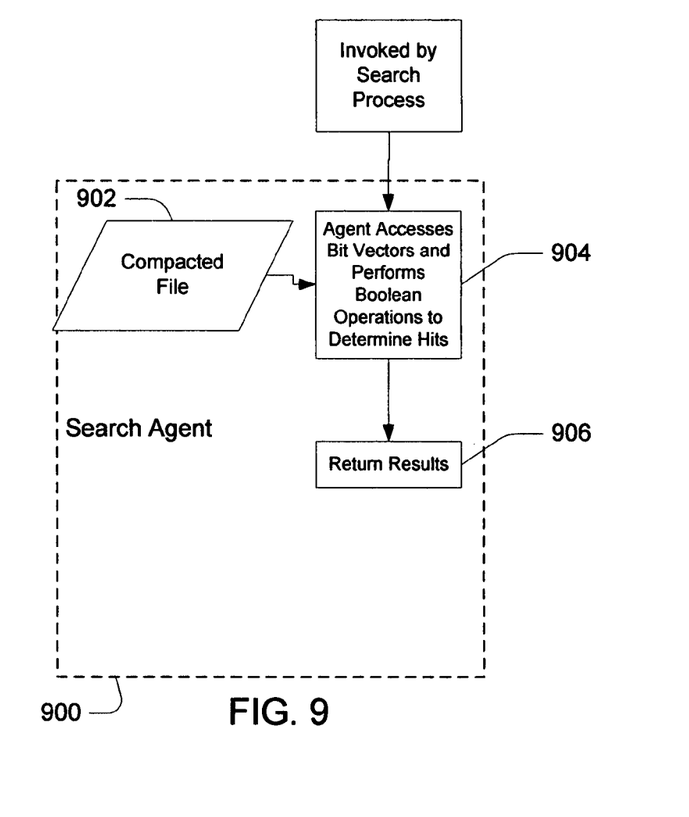
FIG. 9 is a process flow diagram of a search agent process for an archive system using compacted files having bit vectors in accordance with an exemplary embodiment of the present invention.

FIG. 9 is a process flow diagram of a search agent process for an archive system using compacted files having bit vectors in accordance with an exemplary embodiment of the present invention. The operation of a search process 204 (of FIG. 2) is similar whether or not a compacted file uses bit vectors or compressed segments. However, the operations of a search agent, such as search agent 205a (of FIG. 2), are different depending on whether or not the compacted file accessed by the search agent includes bit vectors or compressed segments. A search agent 900 used with compacted files having bit vectors is invoked 901 by a search process. The search agent accesses a compacted file 902 selected by the search process. The search agent then selects (904) one or more bit vectors corresponding to a datum that the search agent is searching for. The search agent then performs a Boolean operation on the selected bit vectors to determine if the data in the compacted file satisfies a query received from the search process 204 (of FIG. 2). At the completion of the Boolean operation, a bit vector is created to act as a selector which is used to identify which tuples should be returned. Based on the projection list, list of columns or attributes to be returned in the request, and the bit vector record selector, the search agent materializes the result data. The materialization of the result data is executed doing an inversion process where the token id of the desired tuples are replaced with the value using a lookup function is used to implement it. At the completion of that materialization process, the search agent returns 906 any results to the invoking search process. Bit vector processing in general is discussed in greater detail in U.S. Pat. No. 5,036,457 issued to Glaser et al. the contents of which are hereby incorporated by reference as if stated in full herein.

Figure 10:
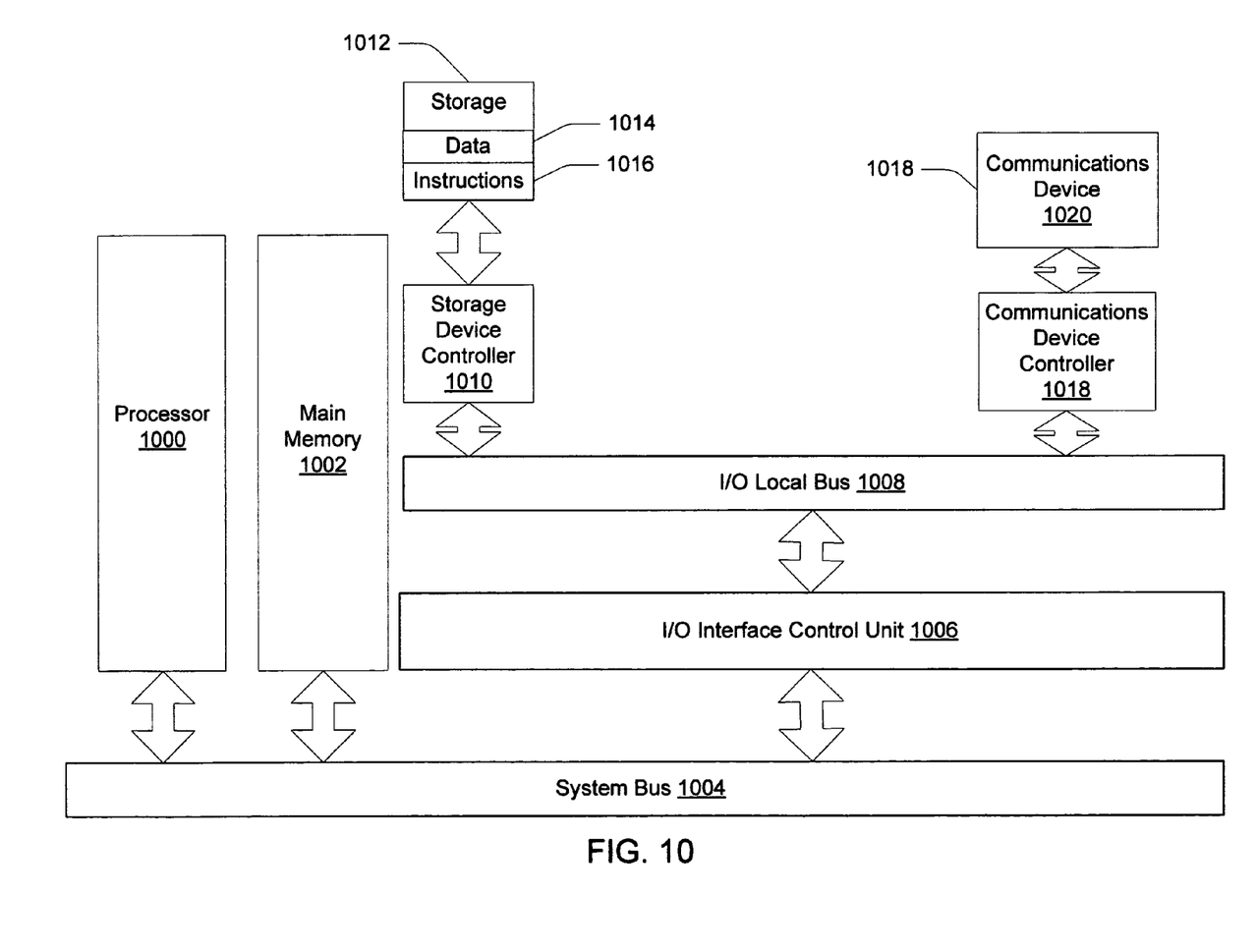
FIG. 10 is a architecture diagram of a data processing system in accordance with an exemplary embodiment of the present invention.

FIG. 10 is an architecture diagram of a data processing apparatus used as an archive system host in accordance with an exemplary embodiment of the present invention. The data processing apparatus includes a processor 900 operably coupled to a main memory 902 by a system bus 904. The processor is further coupled to a storage device 1012 through an Input/Output (I/O) control unit 1006, an I/O local bus 1008, and a storage device controller 1010. The storage device may be used to store programming instructions 1016.

In operation, the processor loads the programming instructions from the storage device into the main memory. The programming instructions are then executable by the processor to implement the features of an archiving system as described herein. The storage device may also be used to store data 1014 used by the processor to implement the features of the archive system.

The processor may be further coupled to a communications device 1018 via the Input/Output (I/O) control unit, the I/O local bus, and a communications device controller 1018. The processor may then communicate with other data processing systems or file system for retrieval of compacted files.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A method of retrieving, by a data processing system, one or more data values stored in a searchable archive, the method comprising:

selecting, by the data processing system, a compacted file from one or more compacted files associated with a data archive, the selected compacted file comprising a plurality of compressed segments of tokenized data and a metadata file including segment metadata for each of the plurality of compressed segments of tokenized data within the selected compacted file, wherein the tokenized data comprises one or more token values corresponding to one or more data values stored in the data archive;

accessing, by the data processing system, the metadata file within the selected compacted file;

selecting, by the data processing system, a compressed segment from the plurality of compressed segments in the selected compacted file based on the segment metadata stored in the metadata file;

generating, by the data processing system, a decompressed segment from the selected compressed segment without decompressing the entire compacted file;

searching, by the data processing system, the decompressed segment to determine if the decompressed segment includes one or more token values corresponding to the one or more data values being searched for;

compiling, by the data processing system, search results from each compacted file which match the token value being searched for; and returning, by the data processing system, the search results.

2. The method of claim 1 wherein:

said selecting a compacted file is performed by a search process; and said accessing the selected compacted file, said selecting a compressed segment, said generating a decompressed segment, and said searching the decompressed segment are performed by one or more search agents invoked by the search process.

3. A method of retrieving, by a data processing system, one or more data values stored in a searchable archive, the method comprising:

selecting, by the data processing system, a compacted file from one or more compacted files associated with a data archive, the selected compacted file including one or more compressed segments of tokenized data represented as bit vectors and a metadata file containing bit vector segment metadata, wherein the tokenized data comprises one or more token values corresponding to one or more data values stored in the data archive;

accessing, by the data processing system, the metadata file within the selected compacted file;

selecting, by the data processing system, one or more of the bit vectors corresponding to one or more data values being searched for from the selected compacted file based on the bit vector segment metadata stored in the metadata file;

performing, by the data processing system, a Boolean operation on the bit vectors included in the selected compacted file to determine if the one or more token values corresponding to the one or more data values being searched for are contained within the selected compacted file;

compiling search results from each compacted file which match the token value being searched for and returning the search results.

4. The method of claim 3, wherein:

said selecting a compacted file is performed by a search process; and said accessing the selected compacted file and said performing a Boolean operation is performed by one or more search agents invoked by the search process.

5. A data processing system for retrieving one or more data values stored in a searchable archive, the system comprising:

a data store storing one or more compacted files;

a processor coupled to the data store;

a memory coupled to the processor, the memory having stored therein program instructions executable by the processor and which cause the processor to:

select a compacted file from one or more compacted files associated with a data archive, the selected compacted file including comprising a plurality of compressed segments of tokenized data and a metadata file including segment metadata more for each of the plurality of compressed segments of tokenized data within the selected compacted file, wherein the tokenized data a comprises one or more token values corresponding to one or more data values stored in the data archive;

enable access of the metadata file within the selected compacted file;

select a compressed segment from the plurality of compressed segments in the selected compacted file based on the segment metadata stored in the metadata file;

generate a decompressed segment from the selected compressed segment without decompressing the entire compacted file;

search the decompressed segment to determine if the decompressed segment includes one or more token values corresponding to the one or more data values being searched for;

compile search results from each compacted file which match the token value being searched for and return the search results.

6. The data processing system of claim 5, wherein:

selection of a compacted file is performed by a search process; and accessing the selected compacted file, selecting a compressed segment, generating a decompressed segment, and searching the decompressed segment are performed by one or more search agents invoked by the search process.

7. A data processing system for retrieving one or more data values stored in a searchable archive, the system comprising:

a data store storing one or more compacted files;

a processor coupled to the data store; and a memory coupled to the processor, the memory having stored therein program instructions executable by the processor and which cause the processor to:

select a compacted file from one or more compacted files associated with a data archive, the selected compacted file including one or more compressed segments of tokenized data represented as bit vectors and a metadata file containing bit vector segment metadata, wherein the tokenized data comprises one or more token values corresponding to one or more data values stored in the data archive;

enable access of the metadata file within the selected compacted file;

select one or more of the bit vectors corresponding to one or more data values being searched for from the selected compacted file based on the bit vector segment metadata stored in the metadata file;

perform a Boolean operation on the bit vectors included in the selected compacted file to determine if the one or more token values corresponding to the one or more data values being searched for are contained within the selected compacted file;

compile search results from each compacted file which match the token value being searched for and return the search results.

8. The data processing system of claim 7, wherein:

selection of a compacted file is performed by a search process; and accessing the selected compacted file and performing a Boolean operation is performed by one or more search agents invoked by the search process.

9. The method of claim 1, wherein said selecting by the data processing system of a compressed segment is performed without decompressing the one or more compressed segments of tokenized data.

10. The method of claim 1, wherein the metadata file includes values identifying a token value range index for selecting the compacted file.

11. The method of claim 10, wherein the range index includes the minimum and maximum token values of the tokens that are stored in the associated compacted file.

12. The method of claim 1 further comprising:
recording token-value to archive-data-value relationships during the data tokenization process;
extracting the token value range for each of the tokenized data segments prior to compression;
and
storing the relationships and range information in an index file.

13. The method of claim 12, wherein said selecting of a compacted file is based on the range information in the index file.

14. The method of claim 12, wherein the index file is stored in a central data repository.

15. The method of claim 3, wherein the metadata file includes values identifying a token value range index for selecting the compacted file.

16. The method of claim 15, wherein the range index includes the minimum and maximum token values of the tokens that are stored in the associated compacted file.

17. The method of claim 3 further comprising:
recording token-value to archive-data-value relationships during the data tokenization process;
extracting the token value range for each of the tokenized data segments prior to compression;
and
storing the relationships and range information in an index file.

18. The method of claim 17, wherein said selecting of a compacted file is based on the range information in the index file.

19. The method of claim 17, wherein the index file is stored in a central data repository.

20. The data processing system of claim 5, wherein:
token-value to archive-data-value relationships are recorded during the data tokenization process;
the token value range for each of the tokenized data segments is extracted prior to compression; and
the relationships and range information are stored in an index file.

21. The data processing system of claim 20, wherein said selecting of a compacted file is based on the range information in the index file.

22. The data processing system of claim 5, wherein said selection by the data processing system of a compressed segment is performed without decompressing the one or more compressed segments of tokenized data.

23. The data processing system of claim 5, wherein the metadata file includes values identifying a token value range index for selecting the compacted file.

24. The data processing system of claim 23, wherein the range index includes the minimum and maximum token values of the tokens that are stored in the associated compacted file.

25. The data processing system of claim 20, wherein the index file is stored in a central data repository.

26. The data processing system of claim 7, wherein the metadata file includes values identifying a token value range index for selecting the compacted file.

27. The data processing system of claim 26, wherein the range index includes the minimum and maximum token values of the tokens that are stored in the associated compacted file.

28. The data processing system of claim 7, wherein:
token-value to archive-data-value relationships are recorded during the data tokenization process;
the token value range for each of the tokenized data segments is extracted prior to compression; and
the relationships and range information are stored in an index file.

29. The data processing system of claim 28, wherein said selecting of a compacted file is based on the range information in the index file.

30. The data processing system of claim 28, wherein the index file is stored in a central data repository.

* * * * *

UNITED STATES PATENT AND TRADEMARK OFFICE
CERTIFICATE OF CORRECTION

| | | |
|---|---|---|
| PATENT NO. | : 8,386,435 B2 | Page 1 of 1 |
| APPLICATION NO. | : 11/746583 | |
| DATED | : February 26, 2013 | |
| INVENTOR(S) | : Grondin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 352 days.

Signed and Sealed this
Twenty-fifth Day of November, 2014

Michelle K. Lee
*Deputy Director of the United States Patent and Trademark Office*